(12) United States Patent
Brown, Jr.

(10) Patent No.: US 8,042,299 B1
(45) Date of Patent: Oct. 25, 2011

(54) MOLE TRAP

(76) Inventor: Elgin Glen Brown, Jr., Mio, MI (US)

(*) Notice: Subject to any disclaimer, the term of this patent is extended or adjusted under 35 U.S.C. 154(b) by 180 days.

(21) Appl. No.: 12/426,250

(22) Filed: Apr. 19, 2009

Related U.S. Application Data

(63) Continuation-in-part of application No. 11/532,292, filed on Sep. 15, 2006, now abandoned.

(60) Provisional application No. 60/596,490, filed on Sep. 28, 2005.

(51) Int. Cl.
*A01M 23/34* (2006.01)
*A01M 23/36* (2006.01)

(52) U.S. Cl. .................... 43/86; 43/85; 43/77; 43/80

(58) Field of Classification Search ............ 43/85–87, 43/77–80, 96, 97
See application file for complete search history.

(56) References Cited

U.S. PATENT DOCUMENTS

| | | | | |
|---|---|---|---|---|
| 69,777 A * | 10/1867 | Curtis | | 43/86 |
| 133,407 A * | 11/1872 | Brown | | 43/80 |
| 135,134 A * | 1/1873 | Lawrence | | 43/80 |
| 225,144 A * | 3/1880 | Kisinger | | 43/86 |
| 233,123 A * | 10/1880 | Stevens et al. | | 43/80 |
| 242,208 A * | 5/1881 | Mabbett, Jr. | | 43/80 |
| RE9,867 E * | 9/1881 | Herbert | | 43/81 |
| 346,218 A * | 7/1886 | Olmsted | | 43/80 |
| 351,678 A * | 10/1886 | Williams | | 43/80 |
| 359,454 A * | 3/1887 | Marlin | | 43/80 |
| 365,763 A * | 6/1887 | Swan | | 43/79 |
| 450,545 A * | 4/1891 | Warner | | 43/86 |
| 529,801 A * | 11/1894 | Nash | | 43/86 |
| 549,977 A * | 11/1895 | Seitz | | 43/86 |
| 551,412 A * | 12/1895 | Stephens | | 43/86 |
| 566,912 A * | 9/1896 | Jones | | 43/80 |
| 663,022 A * | 12/1900 | Granbery | | 43/79 |
| 678,220 A * | 7/1901 | Brunker | | 43/86 |
| 689,324 A * | 12/1901 | Rittenhouse | | 43/80 |
| 731,977 A * | 6/1903 | Titus | | 172/25 |
| 820,686 A * | 5/1906 | Walker | | 43/80 |
| 834,495 A * | 10/1906 | Sandefur | | 43/79 |
| 861,174 A * | 7/1907 | Heil | | 43/80 |
| 882,755 A * | 3/1908 | Hamilton | | 43/86 |
| 895,017 A * | 8/1908 | Hooker | | 43/86 |
| 895,018 A * | 8/1908 | Hooker | | 43/86 |
| 928,395 A * | 7/1909 | Morgan | | 43/86 |
| 936,808 A * | 10/1909 | Pozsonyi | | 43/86 |

(Continued)

FOREIGN PATENT DOCUMENTS

DE 3101182 A1 * 11/1981

(Continued)

*Primary Examiner* — Darren W Ark
(74) *Attorney, Agent, or Firm* — Robert L. Farris; Farris Law, P.C.

(57) ABSTRACT

The mole trap includes a base assembly and an upper movable frame. Two vertical guide rods are attached to the base assembly and pass through the bores through the upper movable frame. Springs urge the movable frame away from the base. Two U-shaped rods are attached to the movable frame and extend under the base. An upper horizontal pin is fixed to the movable frame. A lower horizontal pin is fixed to the base. A tension link connected to the upper pin. A recess in the link receives the lower pin and holds both springs in loaded condition. A bracket with a tension link recess is pivotally mounted on the lower pin. A tension link release surface on the bracket releases the tension link when a mole sensor pivots the bracket.

11 Claims, 7 Drawing Sheets

U.S. PATENT DOCUMENTS

| | | | | |
|---|---|---|---|---|
| 964,877 | A * | 7/1910 | Nepean-Hutchison | 43/80 |
| 1,033,755 | A * | 7/1912 | Calvert | 43/79 |
| 1,049,406 | A * | 1/1913 | Scheffer | 43/86 |
| 1,065,130 | A * | 6/1913 | Hoover | 43/86 |
| 1,079,827 | A * | 11/1913 | Beers | 43/86 |
| 1,132,697 | A * | 3/1915 | Uhlrig | 43/80 |
| 1,199,901 | A * | 10/1916 | Keeffner | 43/81 |
| 1,238,679 | A * | 8/1917 | Jacob | 43/97 |
| 1,315,510 | A * | 9/1919 | Juricek | 43/86 |
| 1,330,622 | A * | 2/1920 | Corsaw | 43/80 |
| 1,344,807 | A * | 6/1920 | Maron | 43/86 |
| 1,351,351 | A * | 8/1920 | Stankiewicz | 43/86 |
| 1,366,995 | A * | 2/1921 | Wolfe | 43/86 |
| 1,382,125 | A * | 6/1921 | Schroeter | 43/80 |
| 1,480,151 | A * | 1/1924 | Cosman | 172/19 |
| 1,483,644 | A * | 2/1924 | Rose et al. | 43/78 |
| 1,489,916 | A * | 4/1924 | Blamphin | 175/20 |
| 1,492,732 | A * | 5/1924 | Knopf | 43/124 |
| 1,583,679 | A * | 5/1926 | Elkins | 43/78 |
| 1,584,677 | A * | 5/1926 | Stacy | 43/78 |
| 1,626,903 | A * | 5/1927 | Wyman | 43/86 |
| 1,858,713 | A * | 5/1932 | Martin | 43/96 |
| 1,866,073 | A * | 7/1932 | Aberle | 172/22 |
| 1,893,258 | A * | 1/1933 | Washburn | 172/21 |
| 1,918,582 | A * | 7/1933 | Alvau | 43/80 |
| 1,965,177 | A * | 7/1934 | Finkl | 172/21 |
| 1,970,672 | A * | 8/1934 | Prestenback | 43/96 |
| 2,009,635 | A * | 7/1935 | Remlinger | 43/80 |
| 2,020,571 | A * | 11/1935 | Pick | 172/21 |
| 2,086,826 | A * | 7/1937 | Smith | 43/80 |
| 2,104,083 | A * | 1/1938 | Krahl | 43/78 |
| 2,148,813 | A * | 2/1939 | Hosmer | 43/78 |
| 2,210,440 | A * | 8/1940 | Avary | 172/22 |
| 2,348,002 | A * | 5/1944 | Glass | 43/86 |
| 2,357,414 | A * | 9/1944 | McJunkin | 43/86 |
| 2,475,467 | A * | 7/1949 | Alvan | 43/80 |
| 2,507,284 | A * | 5/1950 | Sullivan | 43/79 |
| 2,542,942 | A * | 2/1951 | Purlee | 43/78 |
| 2,544,145 | A * | 3/1951 | Ellwein | 43/87 |
| 2,612,719 | A * | 10/1952 | Legg | 43/79 |
| 2,615,246 | A * | 10/1952 | Littig | 172/19 |
| 2,683,951 | A * | 7/1954 | Hamaker | 43/80 |
| 2,778,148 | A * | 1/1957 | Schmidt | 43/80 |
| 3,013,358 | A * | 12/1961 | Wilken | 43/80 |
| 3,062,299 | A * | 11/1962 | Koepfinger | 172/19 |
| 3,143,176 | A * | 8/1964 | Drane, Jr. | 172/13 |
| 3,180,427 | A * | 4/1965 | Leeper, Jr. | 172/21 |
| 3,273,930 | A * | 9/1966 | Gottfried | 172/22 |
| 3,488,878 | A * | 1/1970 | Morodomi | 43/86 |
| 3,538,866 | A * | 11/1970 | Gaines | 43/129 |
| 3,554,293 | A * | 1/1971 | Aman et al. | 172/25 |
| 3,585,738 | A * | 6/1971 | De Koning | 175/20 |
| 3,814,189 | A * | 6/1974 | Thompson | 172/13 |
| 3,830,310 | A * | 8/1974 | Williams | 172/22 |
| 3,865,055 | A * | 2/1975 | Gilbaugh | 172/22 |
| 3,905,103 | A * | 9/1975 | Ford et al. | 172/15 |
| 3,927,720 | A * | 12/1975 | Rauch | 172/22 |
| 3,951,212 | A * | 4/1976 | Hallman | 172/19 |
| 4,016,672 | A * | 4/1977 | Joncas | 43/86 |
| 4,022,283 | A * | 5/1977 | Morgan | 172/15 |
| 4,092,112 | A * | 5/1978 | Calkins et al. | 43/125 |
| 4,108,439 | A * | 8/1978 | McGuire | 172/19 |
| 4,230,355 | A * | 10/1980 | Petrunich | 43/96 |
| 4,267,660 | A * | 5/1981 | Kielhorn | 43/96 |
| 4,414,773 | A * | 11/1983 | Moyers | 43/97 |
| 4,494,335 | A * | 1/1985 | Gaines | 43/80 |
| 4,498,547 | A * | 2/1985 | Herkness, II | 172/22 |
| 4,517,762 | A * | 5/1985 | Venetz | 43/96 |
| 4,547,966 | A * | 10/1985 | Eden | 30/300 |
| 4,570,376 | A * | 2/1986 | Leggett et al. | 43/96 |
| 4,585,072 | A * | 4/1986 | Martinez | 172/22 |
| 4,768,306 | A * | 9/1988 | Hilbun | 43/125 |
| 4,776,128 | A * | 10/1988 | Townsend | 43/80 |
| 4,790,102 | A * | 12/1988 | McPherson | 43/86 |
| 4,790,392 | A * | 12/1988 | Clements | 175/20 |
| 4,827,662 | A * | 5/1989 | Dahlman | 43/87 |
| 4,829,706 | A * | 5/1989 | Perry | 43/125 |
| 4,848,484 | A * | 7/1989 | Clements | 172/22 |
| 4,884,638 | A * | 12/1989 | Hoffman | 172/22 |
| D306,814 | S * | 3/1990 | Shields | 172/19 |
| 4,932,339 | A * | 6/1990 | List | 172/22 |
| 4,934,464 | A * | 6/1990 | Shields | 172/19 |
| 4,966,238 | A * | 10/1990 | Shields | 172/22 |
| 4,989,678 | A * | 2/1991 | Thompson | 175/20 |
| 5,088,562 | A * | 2/1992 | Shields | 172/22 |
| 5,109,628 | A * | 5/1992 | Ellefson | 43/125 |
| 5,242,024 | A * | 9/1993 | Van Houten | 172/22 |
| 5,245,878 | A * | 9/1993 | Underwood | 175/20 |
| 5,337,831 | A * | 8/1994 | Chopp | 172/22 |
| 5,398,624 | A * | 3/1995 | Caron | 172/22 |
| 5,464,067 | A * | 11/1995 | Dulak | 172/19 |
| 5,469,923 | A * | 11/1995 | Visser | 172/22 |
| 5,492,181 | A * | 2/1996 | Grant | 172/22 |
| 5,542,476 | A * | 8/1996 | Hansen | 172/22 |
| 5,555,943 | A * | 9/1996 | Blasczyk | 172/22 |
| 5,588,252 | A * | 12/1996 | Jones | 43/125 |
| 5,692,336 | A * | 12/1997 | Fiore et al. | 43/85 |
| 5,865,259 | A * | 2/1999 | Catto | 172/22 |
| 5,868,206 | A * | 2/1999 | Miller | 172/21 |
| D423,889 | S * | 5/2000 | Heffner | D8/1 |
| 6,098,724 | A * | 8/2000 | Ricker | 175/20 |
| 6,123,374 | A * | 9/2000 | Elder | 294/50 |
| 6,125,948 | A * | 10/2000 | David et al. | 175/20 |
| 6,145,600 | A * | 11/2000 | Dickinson | 175/20 |
| 6,330,921 | B1 * | 12/2001 | Barber | 172/22 |
| 6,386,294 | B1 * | 5/2002 | Best | 172/22 |
| 6,604,318 | B1 * | 8/2003 | Cassidy | 43/132.1 |
| 6,662,879 | B1 * | 12/2003 | Costa | 172/22 |
| 6,712,161 | B1 * | 3/2004 | Dai | 172/22 |
| 6,739,401 | B1 * | 5/2004 | Sova | 172/22 |
| 6,752,219 | B1 * | 6/2004 | Fridd | 172/22 |
| 6,802,152 | B2 * | 10/2004 | Hagen et al. | 43/79 |
| 6,807,767 | B1 * | 10/2004 | Schade | 43/77 |
| 6,868,633 | B2 * | 3/2005 | Schroedl | 43/80 |
| 7,069,688 | B2 * | 7/2006 | Hill | 43/85 |
| 7,076,913 | B1 * | 7/2006 | Dow et al. | 43/80 |
| 7,121,356 | B2 * | 10/2006 | Michael | 172/19 |
| 7,150,238 | B1 * | 12/2006 | Kontorovich et al. | 172/22 |
| 7,198,113 | B1 * | 4/2007 | Schoppe | 172/22 |
| 7,240,743 | B2 * | 7/2007 | Buss et al. | 175/20 |
| 7,779,574 | B1 * | 8/2010 | Miller et al. | 43/78 |
| 2001/0004019 | A1 * | 6/2001 | Wakefield | 172/22 |
| 2005/0087349 | A1 * | 4/2005 | Corbett et al. | 172/22 |
| 2007/0068065 | A1 * | 3/2007 | Brown, Jr. | 43/80 |
| 2008/0092431 | A1 * | 4/2008 | Fritzboger | 43/79 |
| 2008/0179099 | A1 * | 7/2008 | McNulty | 172/22 |
| 2008/0190664 | A1 * | 8/2008 | Hammond | 175/20 |
| 2010/0031555 | A1 * | 2/2010 | Le Laidier et al. | 43/77 |

FOREIGN PATENT DOCUMENTS

| | | | |
|---|---|---|---|
| FR | 2598060 A1 * | 11/1987 | |
| FR | 2838922 A1 * | 10/2003 | |
| FR | 2856890 A1 * | 1/2005 | |
| JP | 11206304 A * | 8/1999 | |
| JP | 2002112689 A * | 4/2002 | |
| JP | 2003180227 A * | 7/2003 | |
| JP | 2003325092 A * | 11/2003 | |
| JP | 2005095010 A * | 4/2005 | |

* cited by examiner

MOLE TRAP

CROSS REFERENCE TO RELATED APPLICATION

This application is a continuation in part of U.S. patent application Ser. No. 11/532,292 filed Sep. 15, 2006 now abandoned and Provisional Application No. 60/596,490 filed Sep. 28, 2005.

TECHNICAL FIELD

This invention relates to a mole trap.

BACKGROUND OF THE INVENTION

Moles make burrows just under the surface of the ground and throw up excavated soil. They live in the burrows and consume insects and other food found in the soil. The burrows tend to kill grass and other vegetation growing above the burrows. The mounds of soil they throw up are unsightly. They multiply and extend their burrows any place where they may find food.

Mole traps have been designed and made over the years to kill moles. These traps have generally had limited success. When making burrow, the moles run into rocks, and man made obstructions. Moles have learned to indentify such objects and burrow around or under them. They avoid detection by the triggering devices on traps frequently thereby avoiding activation of the triggering device and death. Moles apparently avoid activation of traps by not exerting force against metal and other hard objects found in the ground.

Traps that are activated by soil that is pushed upward by moles have some success. Such traps may release spring biased spikes or force moles upward into stationary spikes and death. Moles often avoid releasing the traps by avoiding the application of sufficient force to release a spring or springs. The traps that are available or have been available in the past apply some spring force directly to the spring force release link or links. Moles conserve energy to survive by limiting the force they apply to soil and other materials. The limited force applied by a mole is often insufficient to release the spring force exerted by mole traps on the release linkage or linkages.

SUMMARY OF THE INVENTION

The mole tap includes a base assembly. The base assembly includes a first horizontal portion, and a second horizontal portion that is parallel to and spaced from the first horizontal portion. A first transverse portion is integral with the first horizontal portion and the second horizontal portion. A second transverse portion is spaced from the first transverse portion and integral with the first horizontal portion and the second horizontal portion. A base aperture is encircled by the first transverse portion, the first horizontal portion, the second transverse portion and the second horizontal portion. A third horizontal portion is integral with the first transverse portion and the second transverse portion, parallel to the first horizontal portion and bisects the base aperture.

A first vertical guide rod has a first guide rod lower end anchored to the base assembly near a third horizontal portion first end, and the first transverse portion. A second vertical guide rod has a second guide rod lower end anchored to the base assembly near a third horizontal portion second end and the second transverse portion.

An upper movable frame includes a cross beam portion that is parallel to the third horizontal portion of the base assembly. A left side beam portion is integral with a cross beam portion left end. A right side beam portion is integral with a cross beam portion right end. A left vertical bore through the upper movable frame telescopically receives a first vertical guide rod upper end. A right vertical bore through the upper movable frame telescopically receives a second vertical guide rod upper end. A first vertical guide stop is on the first vertical guide rod upper end. A second vertical guide stop is on the second vertical guide rod upper end. The first vertical guide stop and the second vertical guide stop limit vertical movement of the upper movable frame away from the base assembly.

A first coil spring has a first spring upper arm and a first spring lower arm. A first spring upper arm free end is slidably mounted on the first vertical guide rod. A first spring lower arm free end is slidably mounted on the first vertical guide rod. A second coil spring includes a second spring upper arm and a second spring lower arm. A second spring upper arm free end is slidably mounted on the second vertical guide rod. A second spring lower arm free end is slidably mounted on the second vertical guide rod. The first coil spring and the second coil spring bias the upper movable frame upward and away from the base assembly.

A first U-shaped rod includes a first side portion, a second side portion and a lower transverse bar an upper end of the first side portion passes upward through a vertical bore through the first transverse portion of the loose assembly adjacent to the first horizontal portion. An upper end of the second side portion passes upward through a vertical bore through the first transverse portion of the base assembly adjacent to the second horizontal portion. The upper end of the first side portion and the upper end of the second side portion are both clamped to the left side beam portion of the movable frame and move up and down with the movable frame.

A second U-shaped rod includes a first side portion, a second side portion and a lower transverse bar. The upper end of the first side portion passes upward through a vertical bore through the second transverse portion of the base assembly adjacent to the first horizontal portion. An upper end of the second side portion passes upward through a vertical bore through the second transverse portion of the base assembly adjacent to the second horizontal portion. The upper end of the first side portion and the upper end of the second side portion are both clamped to the right side beam portion of the movable frame and move up and down with the movable frame.

A lower horizontal pin is fixed to the third horizontal portion, and extends transversely toward the second horizontal portion of the base assembly. The lower horizontal pin is positioned an equal distance from the first vertical guide rod and the second vertical guide rod.

An upper horizontal pin is fixed to the cross beam of the upper movable frame and extends transversely to the crossbeam. The upper horizontal pin also extends in the direction of the second horizontal portion of the base assembly. A catch tension link is pivotally attached to the upper horizontal pin. An edge surface of the catch tension link includes a tension link recess. The tension link recess receives the lower horizontal pin on the base assembly to hold the upper movable frame in a lowered position with the first coil spring and the second coil spring tensioned.

A bracket, including a first flange and a second flange, has a bracket through both flanges. The bore receives the lower horizontal pin and pivotally attaches the bracket to the lower horizontal pin and the base assembly. A tension link passage is provided in the bracket. The bracket has an upper release surface and a lower release surface. The upper release surface is movable into engagement with the edge surface of the catch tension member above the tension link recess in response to pivotal movement of the bracket about the lower horizontal pin in one direction. The lower release surface on the bracket is movable into engagement with the edge surface of the catch tension member below the tension link recess in response to pivotal movement of the bracket about the lower horizontal pin in another direction.

A bracket arm extends vertically downward from the bracket. A mole sensor is pivotally mounted on a bracket arm lower end for pivotal movement about a pivot shaft that is parallel to the lower horizontal pin. Moles can exert force in either direction on the mole sensor to release the catch tension link. Upward movement of soil by a mole will also move the mole sensor in one direction or the other and release the catch tension link.

The first vertical guide rod, the second vertical guide rod and the bracket arm are in horizontal alignment with each other.

A plurality of first side vertical spikes have first side spike upper ends secured to the first transverse portion of the base assembly. A plurality of second side vertical spikes have second side spike upper ends secured to the second transverse portion of the base assembly.

BRIEF DESCRIPTION OF DRAWINGS

The presently preferred embodiment of the invention is disclosed in the following description and in the following drawings, wherein.

DETAILED DESCRIPTION OF THE PREFERRED EMBODIMENTS

Figure 1:
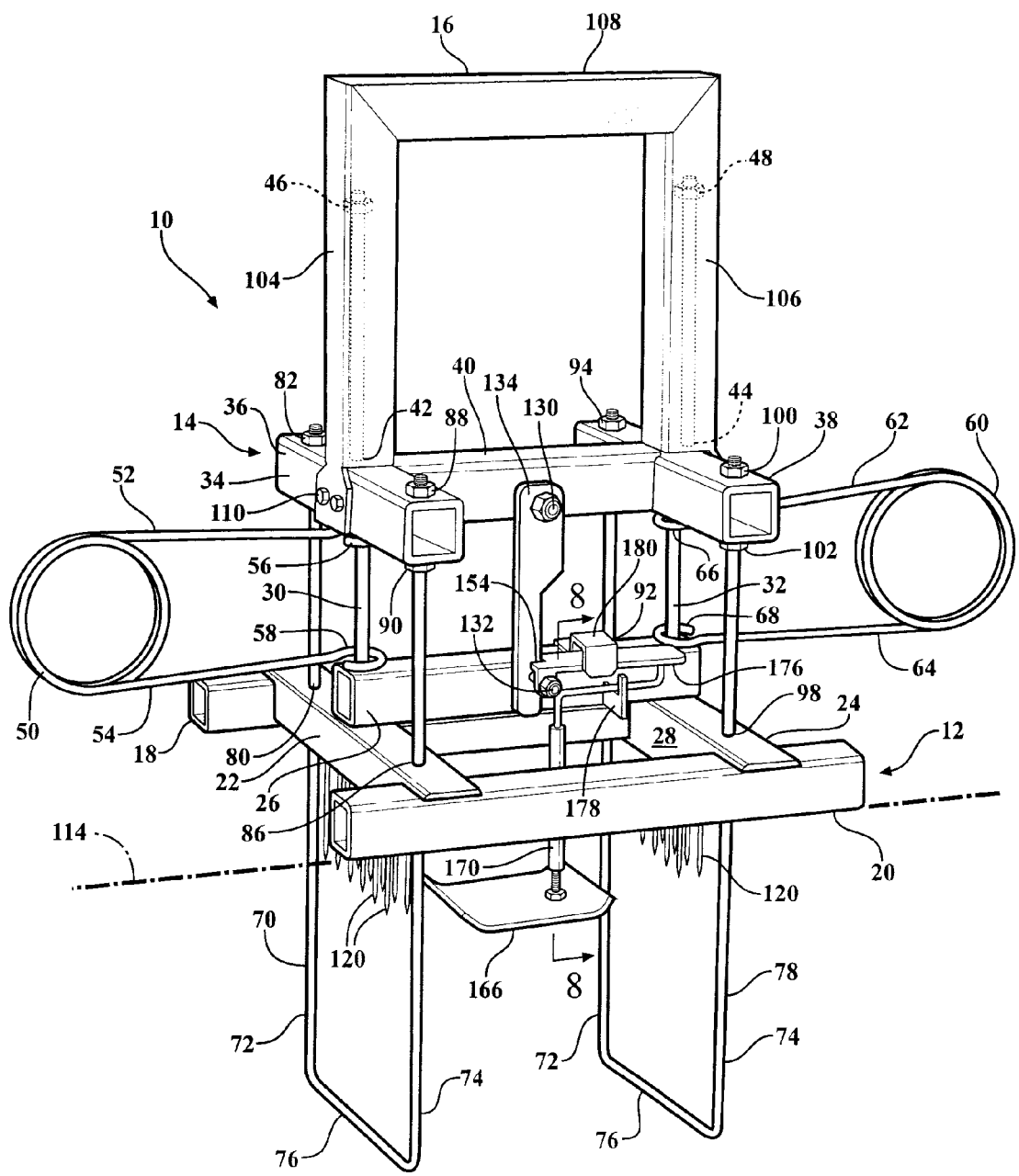
FIG. 1 is a perspective view of the mole trap in a set condition with a vertical release.

The mole trap 10 includes a base assembly 12, an upper movable frame assembly 14, and a handle 16. The base assembly 12 includes a first horizontal member 18 and a second horizontal member 20. The first horizontal member 18 is parallel to the second horizontal member 20, of the base assembly 12, and spaced from the second horizontal member. A first transverse member 22 is perpendicular to the first horizontal member 18 and the second horizontal member 20 and fixed to the first second horizontal members. A second transverse member 24 is parallel to the first transverse member 22, spaced from the first transverse member, and fixed to first horizontal member 18 and the second horizontal member 20. A third horizontal member 26 of the base assembly 12 is parallel to the first horizontal member 20 and is horizontally positioned between the first horizontal member and the second horizontal member 20. The third horizontal member 26 is fixed to the first transverse member 22 and the second transverse member 24. The members 18, 20, 22, 24 and 26 that form the base assembly are metal tubes that are attached together by welding. The first and second horizontal members 18 and 20 and the first and second transverse member 22 and 24 define a base aperture 28 through the base 12. The third horizontal member 26 extends across the center of the base aperture 28 and divides the base aperture into two apertures.

A first vertical guide rod 30 is secured to the first transverse member 22 of the base assembly 12 adjacent to the base aperture 28. A second vertical guide rod 32 is secured to the second transverse member 24 adjacent to the base aperture 28 and on an opposite end of the base aperture from the first vertical guide rod 30. The first and second vertical guide rods 30 and 32 pass vertically upward through bores through the third horizontal member 26. The lower ends of both vertical guide rods 30 and 32 are fixed to the base assembly 12 and do not move relative to the base assembly.

The upper movable frame 14 includes a horizontal movable H-frame 34. The movable frame 34 includes left side beam 36, a right side beam 38 and a cross beam 40 that is perpendicular to both side beams. The left side beam 36, the right side beam 38 and the cross beam 40 are tubular metal members that are welded together. The left side beam 36 is parallel to and vertically spaced from the first transverse member 22. The right side beam 38 is parallel to and vertically spaced from the second transverse member 24. The cross beam 40 is parallel to and vertically spaced from the third horizontal member 26. A vertical guide bore 42 through the left side beam 36 receives the first vertical guide rod 30. A vertical guide bore 44 through the right side beam 38 receives the second vertical guide rod 32. Bearings (not shown) can be provided in the guide bores 42 and 44 if desired to ensure free vertical movement of movable H-frame 34 relative to the first and second vertical guide rods 30 and 32. A nut 46 is screwed onto a free upper end of the first vertical guide rod 30. A nut 48 is screwed onto a free upper end of the second vertical guide rod 32. The nuts 46 and 48 limit upward movement of the movable frame 34 relative to the base assembly 12.

Figure 2:
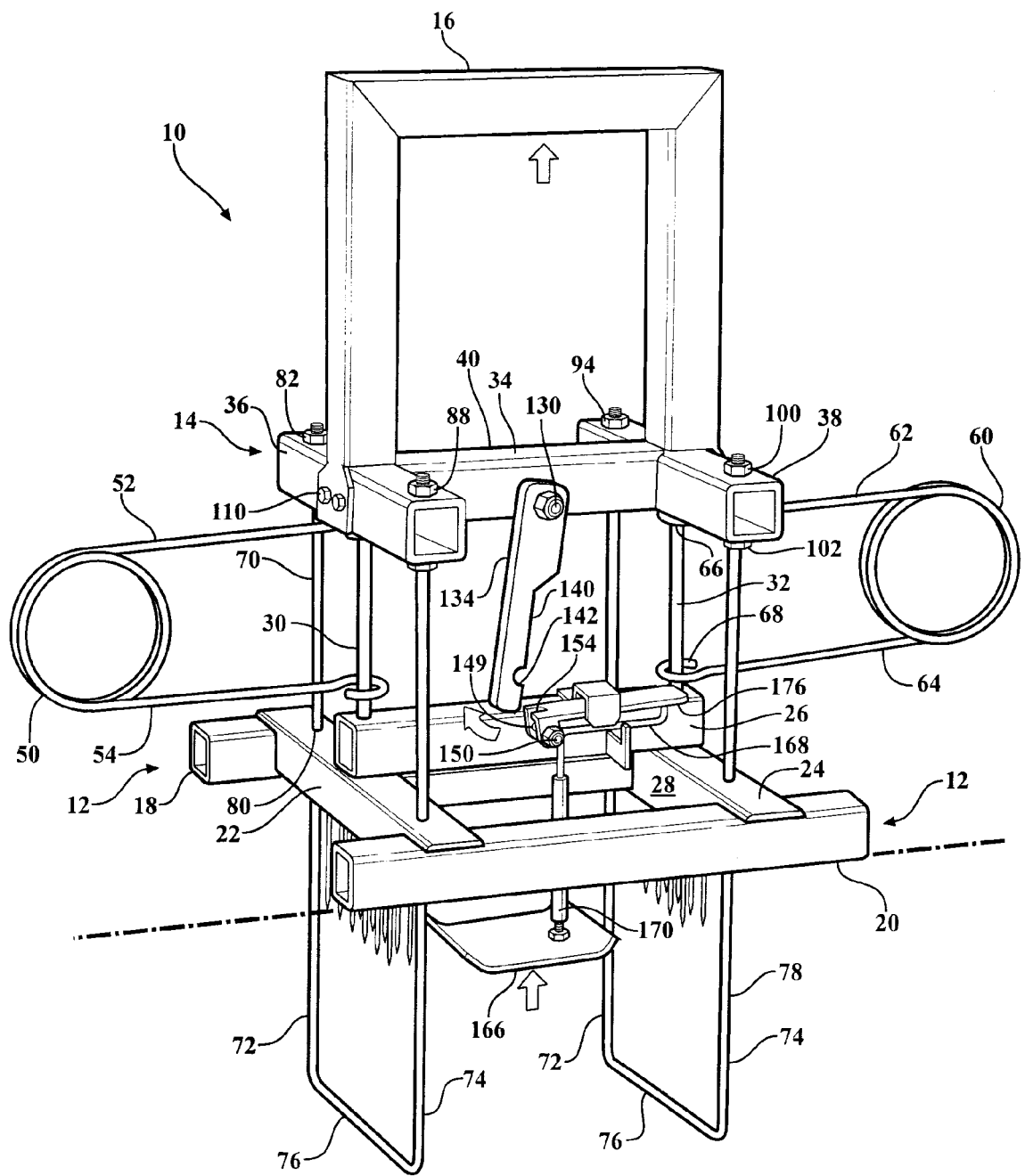
FIG. 2 is a perspective view similar to FIG. 1 showing the trap prior to being set.
Figure 3:
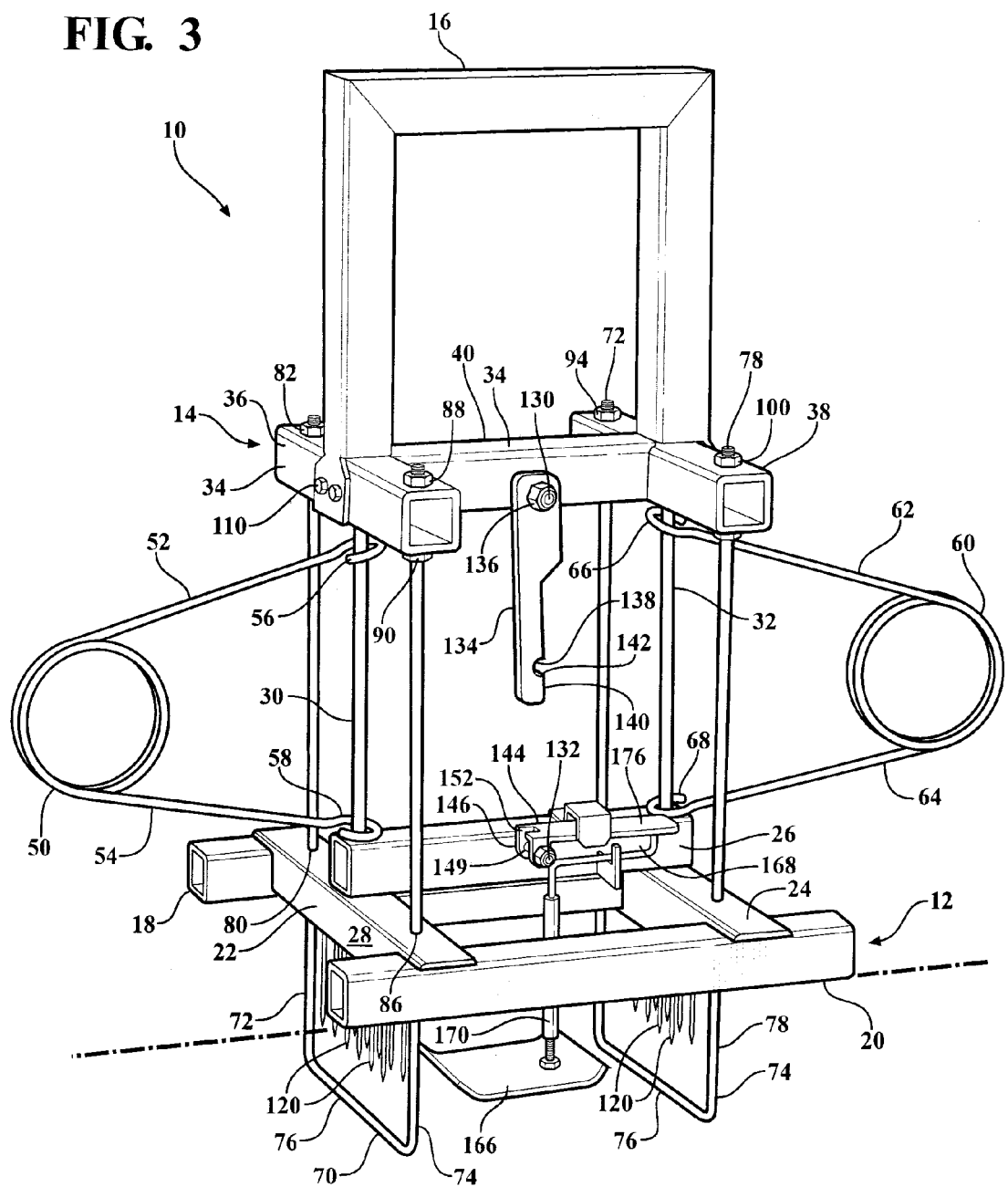
FIG. 3 is a perspective view of the mole tap of FIG. 1 in a release condition.

A first coil spring 50 has an upper arm 52 and a lower arm 54. The free end of the upper arm 52 includes a bight 56 that encircles the first vertical guide rod 30. The free end of the lower arm 54 includes a bight 58 that encircles the first vertical guide rod 30. A second coil spring 60 has an upper arm 62 and a lower arm 64. The free end of the upper arm 62 includes a bight 66 that encircles the second vertical guide rod 32. The free end of the lower arm 64 includes a bight 68 that encircles the second vertical guide rod 32. The coil springs 50 and 60 are compressed as shown in FIGS. 1, 4, 5 and 6. The coil springs 50 and 60 are substantially unloaded as shown in FIG. 3. The coil springs 50 and 60 are shown in FIG. 2 as partially loaded by hooks (not shown) on their upper arms 52 and 62 and lower arms 54 and 64. These optional hooks hold the coil springs 50 and 60 in a partially loaded condition to facilitate setting the trap 10.

A first U-shaped rod 70 has a first side rod portion 72, a second side rod portion 74 and a lower transverse bar 76. The transverse bar 76 is integral with the lower ends of first side rod portion 72 and the lower end of the second side rod portion 74. A second U-shaped rod 78 is identical to the first U-shaped rod 70.

The first side rod portion 72 of the first U-shaped rod 70 slides in a vertical bore 80 through the first transverse member 22 adjacent to the first horizontal member 18 of the base 12. An upper end of the first side portion 72 passes through the left side beam 36 and is anchored to the left side beam by an upper nut 82 and a lower nut. The second side portion 74 slides in a vertical bore 86 through the first transverse member 22 adjacent to the second horizontal member 20 of the base 12. An upper end of the second side portion 74 passes through the left side beam 36 and is anchored to the left side beam by an upper nut 88 and by a lower nut 90.

The first side rod portion 72 of the second U-shaped rod 78 slides in a vertical bore 92 through the second transverse member 24 adjacent to the first horizontal member 18 of the base 12. An upper end of the first side portion 72 passes through the right side beam 38 and is anchored to the right side beam by an upper nut 94 and a lower nut. The second side portion 74 slides in a vertical bore 98 through the second transverse member 24 adjacent to the second horizontal member 20 of the base 12. An upper end of the second side portion 74 passes through the right side beam 38 and is anchored to the right side beam by an upper nut 100 and a lower nut 102.

The handle 16 includes a left vertical tube 104, a right vertical tube 106, and an integral horizontal member 108. The left vertical tube 104 telescopically receives the first vertical guide rod 30 and the nut 46, as shown in FIG. 1. The right vertical tube 106 telescopically receives the second vertical guide rod 32 and the nut 48. The lower end of the left vertical tube 104 is clamped to left side beam 36 of the horizontal movable H-frame 34 by screws 110. The lower end of the right vertical tube 106 is clamped to the right side beam 38 by screws 112.

Figure 6:
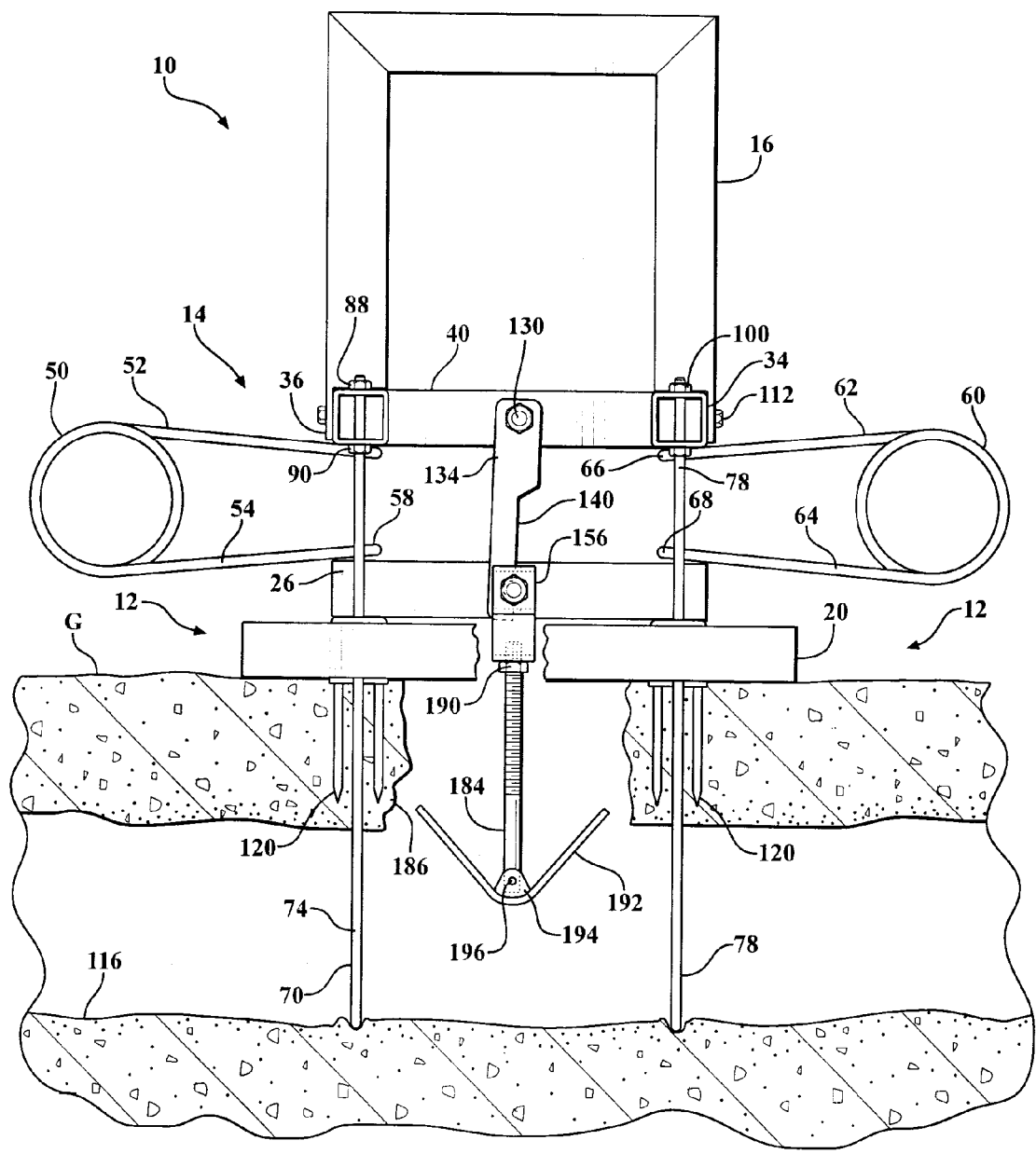
FIG. 6 is a side elevational view similar to FIG. 4 with a horizontal release.

The first U-shaped rod 70 and the second U-shaped rod 78 are received in transverse slots in the ground G. The first horizontal member 18 and the second horizontal member 20 are parallel to a mole passage center line 114. The lower transverse bars 76 are positioned below the bottom of a mole passage 116. The first side portions 72 of the first U-shaped rod 70 and the second U-shaped rod 78 are outside of the mole passage 116 and to a first side of the mole passage. The second side portions 74 of the first U-shaped rod 76 and the second U-shaped rod 78 are outside the mole passage 116 and to a second side of the mole passage 116. The first coil spring 50 and the second coil spring 60 force the upper movable frame upward to move the lower transverse bars 76 of the U-shaped rods 70 and 78 and lift moles toward the rows of spikes 120 fixed to the first and second transverse members 22 and 24. The spikes 120 impale moles and kill them as humanely as possible. The spikes 120 are embedded in the ground G prior to the coil springs 50 and 60 being released as shown in FIG. 6. The ground G above the mole passage has usually been disturbed by the mole prior to setting the mole tap 10. The disturbed ground is displaced to impale a mole. If the soil in which the spikes 120 are embedded is not displaced, the force on the transverse bars 76 is sufficient to kill moles.

An upper horizontal pin 130 is fixed to and extends to one side of cross beam 40 of the upper movable frame 14. The pin 130 is substantially an equal distance from the first vertical guide rod 30 and the second vertical guide rod 32. A lower horizontal pin 132 is fixed to the third horizontal member 26 of the base assembly 12. The lower horizontal pin 132 is an equal distance from the first vertical guide rod 30 and the second vertical guide rod 32. The lower horizontal pin 132 is also parallel to and spaced from the upper horizontal pin 130.

A catch tension link 134 is pivotally attached to the upper horizontal pin 130. A lock nut 136 retains the tension link 134 on the upper horizontal pin 130 and permits free pivotal movement of the tension link relative to the upper horizontal pin. A recess 138 is formed into an edge surface 140 of the tension link 134. The edge surface 140 extends above the recess 138 and below the recess 138. The recess 138 has a recess surface 142 that engages the lower horizontal pin 132. This recess surface 142 is close to the edge surface 140. The recess surface 142 is also nearly tangential to a circle around the upper horizontal pin 130. When the recess surface 142 is in engagement with the lower horizontal pin 132, the tension link 134 holds all of the force exerted by the first coil spring 50 and the second coil spring 60.

A bracket 144 has two flanges 146 and 148 with bores 149 that receive the lower horizontal pin 132. A lock nut 150 holds the bracket 144 on the lower fixed pin 132. The lock nut 150 leaves the bracket 144 free to pivot about the lower fixed pin 132. A tension link slot 152 in the bracket 144 accommodates pivotal movement of the tension link 134 about the upper horizontal pin 130 and movement of the recess surface 142 in the recess 138 into engagement with the lower horizontal pin 132. The bracket 144 is preferably free to pivot at least slightly about the lower horizontal pin 132 when the tension link 134 is holding the springs 50 and 60 in a tensioned condition. The bracket 144 shown in FIGS. 1, 2, 3 and 4 has one release surface 154 that engages the edge surface 140 of the tension link 134 above the recess 138.

Figure 5:
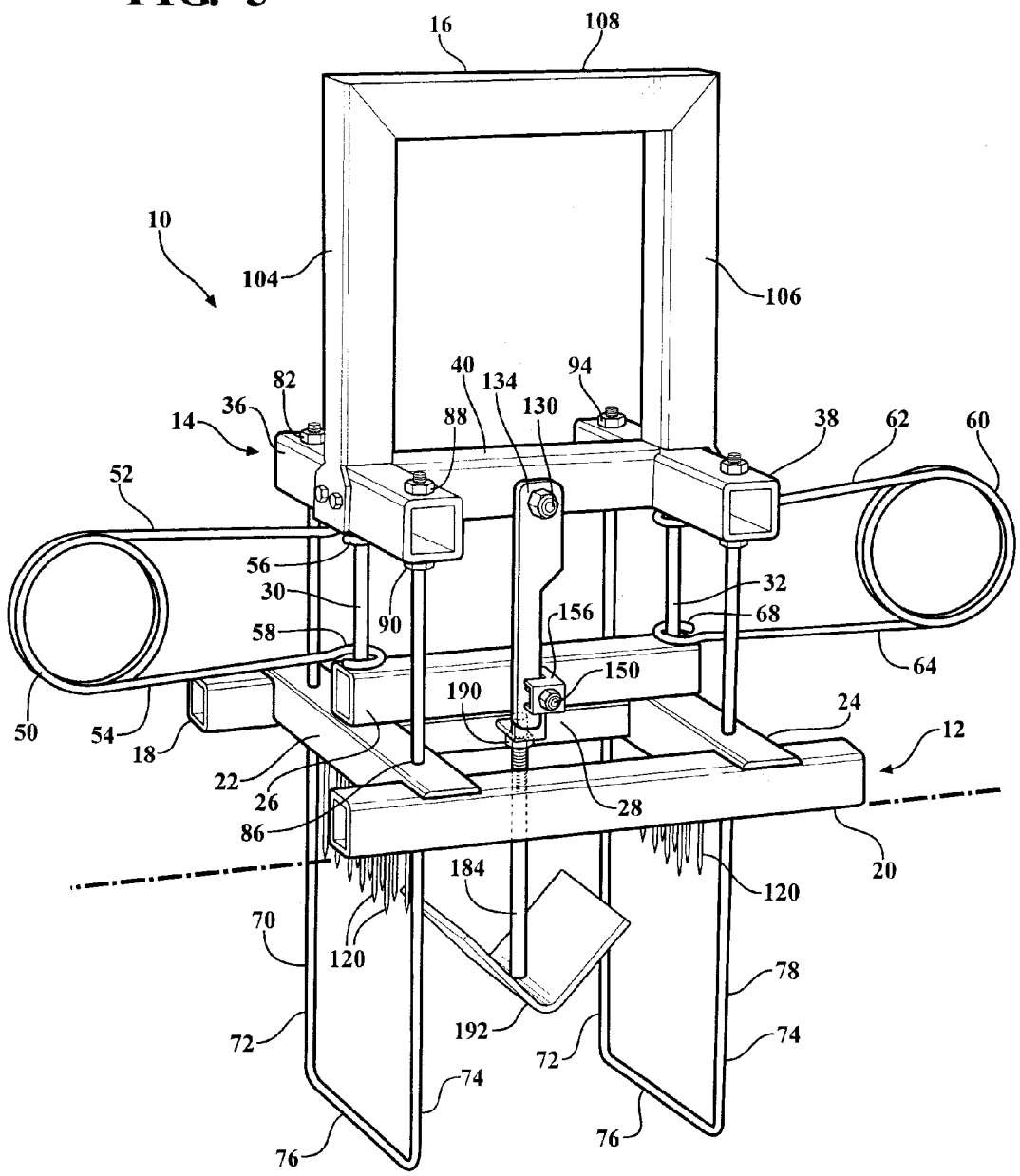
FIG. 5 is a perspective view of the mole trap, in a set condition, with a horizontal release.
Figure 7:
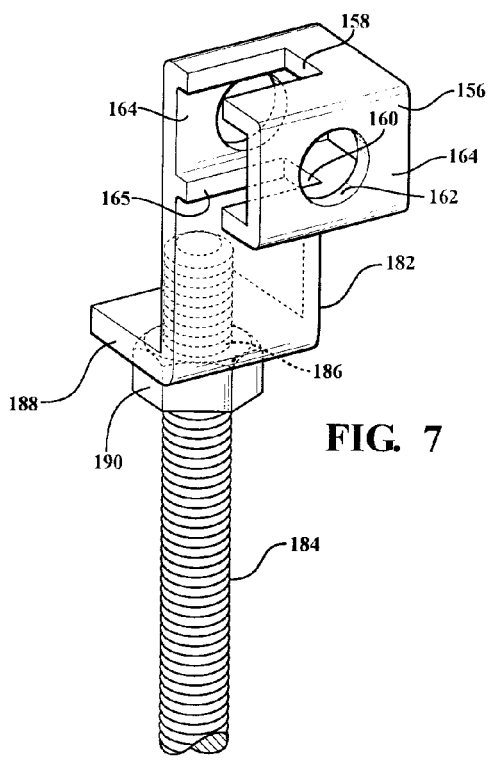
FIG. 7 is an enlarged view of the pivot release for a horizontal force release.

A modified bracket 156, shown in FIGS. 5, 6 and 7 has a release surface 158 that contacts the edge surface 140 on the tension link 134 above the recess 138. A second release surface 160 on the bracket 156 contacts the edge surface 140 on tension link 134 below the recess 138. The bracket 156 has a bore 162 through flanges 164 as shown in FIG. 7. The bore 162 receives the lower horizontal pin 132. A tension link slot 165 is provided in the bracket 156. The lock nut 150 holds the bracket 156 on the lower horizontal pin 132 and permits pivotal movement of the bracket 156 relative to the lower horizontal pin 132.

The release surfaces 154 on bracket 144 and the release surfaces 158 and 160 on the bracket 156 provide a mechanical advantage between ten to one and twenty to one or more depending upon the mole sensing linkage employed.

Figure 4:
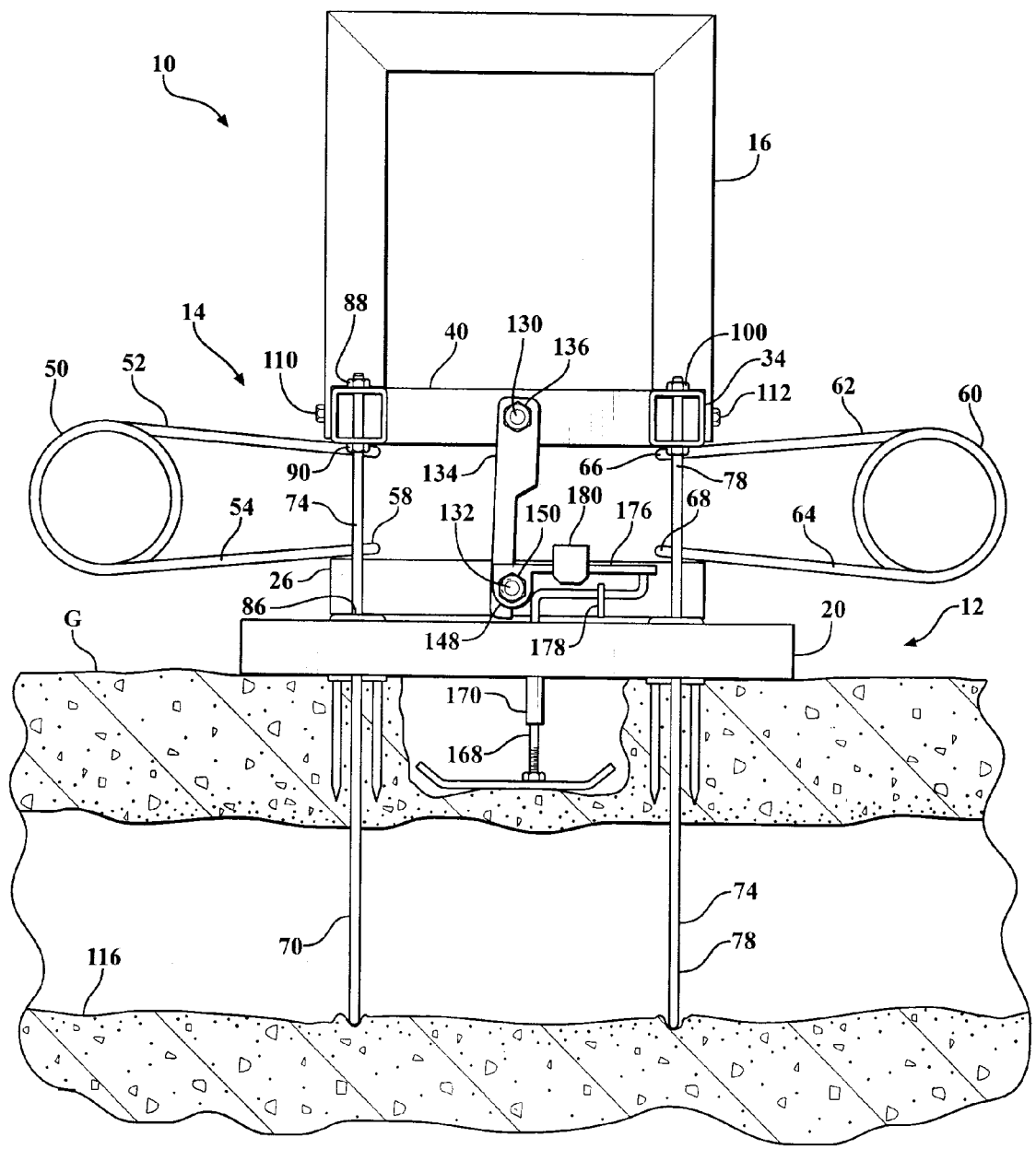
FIG. 4 is a side elevation of the mole trap of FIG. 1 in a set condition and positioned in a working position relative to a burrow passage or run.
Figure 8:
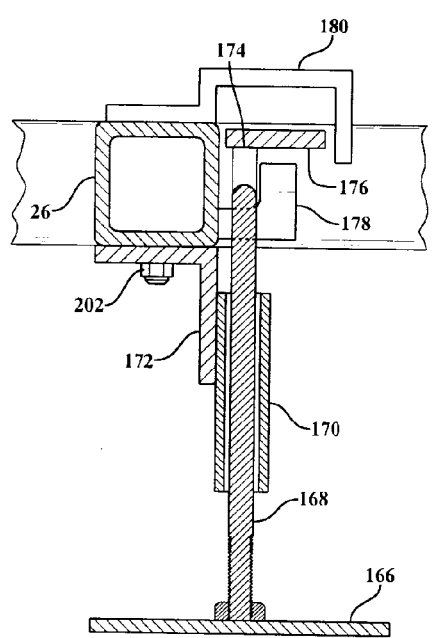
FIG. 8 is an enlarged sectional view of the release linkage for a vertical force release taken along line 8-8 in FIG. 4.

The sensing linkage shown in FIGS. 1 through 4 and FIG. 8 include a plate 166. The plate 166 sits on top of soil above a mole passage 116 as shown in FIG. 4. Soil pushed up by a mole will lift the plate 166. The plate 166 moves a linkage member 168 upward in a vertical tube 170. The tube 170 is welded to an angle member 172. The angle member 172 is clamped to the bottom of the third horizontal member 26 by mechanical fasteners 202. Portions of the linkage member 168 extend radially from the tube 170 to a linkage member free end 174. A bracket arm 176 that is integral with the bracket 144 sits on the linkage member free end 174 as shown in FIG. 8. The bracket arm 176 in combination with the release surface 154 provides a mechanical advantage. The mechanical advantage depending on the length on the bracket arm 176 and linkage member 168 is between ten to one and twenty to one. A mole can release the catch tension link 134 from the lower horizontal pin 132 by lifting the plate 166, the link member 168 and the bracket arm 176 and applying a small force through the release surface 154 to the edge surface 140 of the tension link 134.

The range of movement of the linkage member 168 and the bracket arm 176 is controlled by a rest 178 and a stop 180 connected to the third horizontal member 26 of the base assembly 12. The rest 178 limits downward movement of the linkage member 168 and the bracket arm 176. The stop 180 limits upward movement of the bracket arm 176 and the linkage member 168.

The modified bracket 156, shown in FIGS. 5, 6 and 7 includes an integral L-shaped arm 182. Mole sensing members include a vertical shaft 184 that screws into a threaded vertical bore 186 in the base 188 of the L-shaped arm 182. A lock nut 190 locks the shaft 184 relative to the bracket 156. A plate member 192 is connected to the lower end of the vertical shaft 184. The vertical shaft 184 extends down through a vertical passage 186 and into a mole passage 116. After moles have formed a mole passage 116 in some soils, they do not have a need to move further soil upward. The plate 166 shown in FIG. 4 only works when moles are forcing soil upward. The plate member 192 that extends down into a mole passage 116, as shown in FIG. 6, is required when a mole passage is well used and there is little or no soil blocking the passage. A passage 116 as described above has moles moving in both directions. The plate member 192 must therefore be able to release the catch tension link 134 when a mole is moving in either direction through a passage 116.

The plate member 192, as shown in FIG. 5 is welded to the lower end of the shaft 184. The plate member 192, as shown in FIG. 6, is pivotally connected to the shaft 184 by a pivot pin 196. The pivot pin 196 passes through ears 194 on each side of the shaft 184. Both ears 194 are welded to the plate member 192. The plate member 192 pivots about the pivot pin 196 when contacted by a mole or by soil moved by a mole. Because the plate member 192 provides little resistance, the mole's natural inclination is to move the close wing of the plate member upward. The upward movement pivots the close side of the plate 192 upward about the pivot pin 196 and moves the far side of the plate member downward into the mole passage 116 where the plate and the lower end of the shaft are free to move away from the mole and the bracket 156 can release the tension link 134.

The mole trap 10 can be converted from the version shown in FIGS. 1 through 4 and 8 that senses upward movement of soil on the surface to a version shown in FIGS. 5, 6 and 7 that senses movement of a mole through a mole passage 116 in a short time. To make the change, the angle member 172 is removed from the third horizontal member 26 of the base assembly 12. The vertical tube 170, the linkage member 168 and the plate 166 that are connected to the angle member 172 are removed. There is no need to remove the rest 178 or the stop 180. The lock nut 150 is removed from the lower horizontal pin 132 and the bracket 144 with integral bracket arm 176 is removed from the lower horizontal pin 132. The bracket 156 with two release surfaces 158 and 160 receives the lower horizontal pin 132 in bore 162 through the bracket with two release surfaces. The vertical shaft 184 and the plate member 192 are attached to the bracket. The lock nut 150 is screwed onto the lower horizontal pin 132 to retain the bracket 156 and complete the change. The above steps can be reversed to change the mole trap 10 back to the version shown in FIG. 1.

The first vertical guide rod 30, the vertical shaft 184 and the second vertical guide rod 32 are all in a common vertical plane. The common vertical plane also includes the long axis of the third horizontal member 26 to reduce the possibility of binding between guide pins 30 and 32 and between the first U-shaped rod 70, the second U-shaped rod and the base 12. The upper horizontal pin 130 and the lower horizontal pin 132 are centered between the first vertical guide rod 30 and the second vertical guide rod 32 to prevent binding.

During use of the mole trap 10, mole passage 116 is located. Two vertical cuts transverse to the mole passage 116 are made. A small excavation for a mole sensor is made if required. The excavation may intersect the mole passage 116 as shown in FIG. 6 or it may merely make room for a sensor plate 166 as shown in FIG. 4. The mole trap 10 is then positioned over the mole passage 116 with the first U-shaped rod 70 extending into one of the vertical cuts and the second U-shaped rod 78 extending into the other vertical cut. The third horizontal member 26 of the base assembly is positioned parallel to mole passage center line 114 and in vertical alignment with the mole passage center line. The base assembly 12 is moved downward into engagement with the ground. The integral horizontal member 108 and the upper movable frame 14 are moved downward until the catch tension link 134 can be pivoted about the upper horizontal pin 130 and the recess 138 in the tension link receives the lower horizontal pin 132. Downward force on the horizontal member 108 of handle 16 is released slowly while the catch tension link 134 is held against the lower horizontal pin 132. When the tension link 134 is holding the force exerted by the first coil spring 50 and the second coil spring 60. The horizontal member 108 can be release and the tension link 134 holds the upper movable frame 14 in a lowered position. The mole sensors including the bracket 144 or the bracket 156 are to be unloaded when the trap is set. If the tension link 134 will not hold the spring tension of the first coil spring 50 and the second coil spring 60 it is most likely because the release surface 154 on the bracket 144 or one of the release surfaces 158 or 160 on the bracket 156 will not permit the recess 138 in the catch tension link 134 fully receive the lower horizontal frame. Changes to free up the sensor plate 166 or the sensor plate member 192 will correct a failure of the tension link 134 to hold the tension of both springs 50 and 60.

The sensor plate 192 connected to the lower end of the shaft 184 by the pivot pin 196 can be used to detect upward movement of soil as well as horizontal movement of a mole. The upward movement of soil as shown in FIG. 4 will move the pivoted plate 192 horizontally and release the catch tension link 134 from lower horizontal pin 132. Vertical shafts 184 with different lengths can be selected if needed to accommodate differences in the depth of the mole passage 116.

I claim:

1. A mole trap comprising a base assembly including a first horizontal portion, a second horizontal portion that is parallel to and spaced from the first horizontal portion, a first transverse portion that is integral with the first horizontal portion and the second horizontal portion, a second transverse portion that is spaced from the first transverse portion and integral with the first horizontal portion and the second horizontal portion, a base aperture encircled by the first transverse portion, the first horizontal portion, the second transverse portion, and the second horizontal portion, and a third horizontal portion that is integral with the first transverse portion and the second transverse portion and parallel to the first horizontal portion and the second horizontal portion and bisects the base aperture;

a first vertical guide rod with a first guide rod lower end anchored to the base assembly near a third horizontal portion first end and at the first transverse portion, and a second vertical guide rod with a second guide rod lower end anchored to the base assembly near a third horizontal portion second end and at the second transverse portion;

an upper movable frame including a cross beam portion that is parallel to the third horizontal portion of the base assembly, a left side beam portion integral with a cross beam portion left end, a right side beam portion integral with a cross beam portion right end, a left vertical bore through the upper movable frame that telescopically receives a first vertical guide rod upper end, a right vertical bore through the upper movable frame that telescopically receives a second vertical guide rod upper end, a first vertical guide stop on the first vertical guide rod upper end, a second vertical guide stop on the second vertical guide rod upper end, and wherein the first vertical guide stop and the second vertical guide stop limit vertical movement of the upper movable frame away from the base assembly;

a first coil spring with a first spring upper arm and a first spring lower arm, a first spring upper arm free end slidably mounted on the first vertical guide rod, a first spring lower arm free end slidably mounted on the first vertical guide rod, a second coil spring with a second spring upper arm and a second spring lower arm, a second spring upper arm free end slidably mounted on the second vertical guide rod, a second spring lower arm free end slidably mounted on the second vertical guide rod, and wherein the first coil spring and the second coil spring bias the upper movable frame upward and away from the base assembly;

a first U-shaped rod with a first side portion, a second side portion and a lower transverse bar and wherein an upper end of the first side portion passes upward through a first vertical bore through the first transverse portion of the base assembly adjacent to the first horizontal portion, an upper end of the second side portion passes upward through a second vertical bore through the first transverse portion of the base assembly adjacent to the second horizontal portion, and wherein the upper end of the first side portion and the upper end of the second side portion are both clamped to the left side beam portion of the movable frame and move up and down with the movable frame;

a second U-shaped rod with a first side portion, a second side portion and a lower transverse bar and wherein an upper end of the first side portion passes upward through a first vertical bore through the second transverse portion of the base assembly adjacent to the first horizontal portion, an upper end of the second side portion passes upward through a second vertical bore through the second transverse portion of the base assembly adjacent to the second horizontal portion, and wherein the upper end of the first side portion and the upper end of the second side portion are both clamped to the right side beam portion of the movable frame and move up and down with the upper movable frame;

a lower horizontal pin fixed to the third horizontal portion, extending transversely toward the second horizontal portion of the base assembly, and wherein the lower horizontal pin is positioned an equal distance from the first vertical guide rod and the second vertical guide rod, an upper horizontal pin fixed to the cross beam of the upper movable frame and extending transversely in the direction of the second horizontal portion of the base assembly, a catch tension link pivotally attached to the upper horizontal pin and having an edge surface and a tension link recess in the edge surface and wherein the tension link recess receives the lower horizontal pin on the base assembly to hold the upper movable frame in a lowered position with the first coil spring and the second coil spring tensioned; and a bracket including a first flange, a second flange, bores through both flanges that receive the lower horizontal pin and pivotally attach the bracket to the lower horizontal pin and the base assembly, a tension link slot in the bracket, at least one release surface on the bracket, a bracket arm that extends outward from the bracket, a mole sensor attached to the bracket arm that pivots the bracket arm about the lower horizontal pin, in response to movement of the mole sensor by moles, moves the at least one release surface on the bracket into engagement with the edge surface of the catch tension link and forces the catch tension link to pivot about the upper horizontal pin and free the lower horizontal pin from the tension link recess thereby freeing the upper movable frame to be moved upward by the first coil spring and the second coil spring.

2. A mole trap, as set forth in claim 1 wherein the bracket arm extends vertically downward from the bracket, the at least one release surface on the bracket includes an upper release surface that is engagable with the edge surface of the catch the tension link above the tension link recess and a lower release surface that is engagable with the edge surface of the catch tension link below the tension link recess, the mole sensor is attached to a bracket arm lower end.

3. A mole trap, as set forth in claim 2, wherein the mole sensor is pivotally attached to the bracket arm lower end for pivotal movement about a transverse horizontal axis relative to mole passages.

4. A mole trap, as set forth in claim 1 wherein the bracket arm extends generally horizontally to one side of the lower horizontal pin, a linkage member with a lower linkage end having an attached sensor plate that is raised by moles and a free end engagable with a bracket arm free end portion and a vertical linkage portion that passes through a vertical tube mounted on the base assembly and wherein vertical movement of the sensor plate by moles lifts the linkage member relative to the vertical tube, lifts the bracket arm free end portion, and pivots the bracket about the lower horizontal pin.

5. A mole trap comprising a base assembly including a first horizontal portion, a second horizontal portion that is parallel to and spaced from the first horizontal portion, a first transverse portion that is integral with the first horizontal portion and the second horizontal portion, a second transverse portion that is spaced from the first transverse portion and integral with the first horizontal portion and the second horizontal portion, a base aperture encircled by the first transverse portion, the first horizontal portion, the second transverse portion, and the second horizontal portion, and a third horizontal portion that is integral with the first transverse portion and the second transverse portion and parallel to the first horizontal portion and the second horizontal portion and bisects the base aperture;

a first vertical guide rod with a first guide rod lower end anchored to the base assembly near a third horizontal portion first end and at the first transverse portion, and a second vertical guide rod with a second guide rod lower end anchored to the base assembly near a third horizontal portion second end and at the second transverse portion;

an upper movable frame including a cross beam portion that is parallel to the third horizontal portion of the base assembly, a left side beam portion integral with a cross beam portion left end, a right side beam portion integral with a cross beam portion right end, a left vertical bore through the upper movable frame that telescopically receives a first vertical guide rod upper end, a right vertical bore through the upper movable frame that telescopically receives a second vertical guide rod upper end, a first vertical guide stop on the first vertical guide rod upper end, a second vertical guide stop on the second vertical guide rod upper end, and wherein the first vertical guide stop and the second vertical guide stop limit vertical movement of the upper movable frame away from the base assembly;

a first coil spring with a first spring upper arm and a first spring lower arm, a first spring upper arm free end slidably mounted on the first vertical guide rod, a first spring lower arm free end slidably mounted on the first vertical guide rod, a second coil spring with a second spring upper arm and a second spring lower arm, a second spring upper arm free end slidably mounted on the second vertical guide rod, a second spring lower arm free end slidably mounted on the second vertical guide rod, and wherein the first coil spring and the second coil spring bias the upper movable frame upward and away from the base assembly;

a first U-shaped rod with a first side portion, a second side portion and a lower transverse bar and wherein an upper end of the first side portion passes upward through a first vertical bore through the first transverse portion of the base assembly adjacent to the first horizontal portion, an upper end of the second side portion passes upward through a second vertical bore through the first transverse portion of the base assembly adjacent to the second horizontal portion, and wherein the upper end of the first side portion and the upper end of the second side portion are both clamped to the left side beam portion of the movable frame and move up and down with the movable frame;

a second U-shaped rod with a first side portion, a second side portion and a lower transverse bar and wherein an upper end of the first side portion passes upward through a first vertical bore through the second transverse portion of the base assembly adjacent to the first horizontal portion, and upper end of the second side portion passes upward through a second vertical bore through the second transverse portion of the base assembly adjacent to the second horizontal portion, and wherein the upper end of the first side portion and the upper end of the second side portion are both clamped to the right side beam portion of the movable frame and move up and down with the upper movable frame;

a lower horizontal pin fixed to the third horizontal portion, extending transversely toward the second horizontal portion of the base assembly, and wherein the lower horizontal pin is positioned an equal distance from the first vertical guide rod and the second vertical guide rod, an upper horizontal pin fixed to the cross beam of the upper movable frame and extending transversely in the direction of the second horizontal portion of the base assembly, a catch tension link pivotally attached to the upper horizontal pin and having an edge surface and a tension link recess in the edge surface and wherein the tension link recess receives the lower horizontal pin on the base assembly to hold the upper movable frame in a lowered position with the first coil spring and the second coil spring tensioned; and a bracket including a first flange, a second flange, bores through both flanges that receive the lower horizontal pin and pivotally attach the bracket to the lower horizontal pin and the base assembly, a tension link slot in the bracket, a release surface on the bracket, a bracket arm integral with the bracket, extending generally horizontally to one side of the lower horizontal pin, a linkage member with a lower linkage end, a sensor plate attached to the lower linkage end, a linkage free end engagable with a bracket arm free end portion, a vertical linkage portion that passes through a vertical tube mounted on the base assembly and wherein vertical movement of the sensor plate by moles lifts the linkage member relative to the vertical tube, lifts the bracket arm free end portion, pivots the bracket about the lower horizontal pin, moves the release surface on the bracket into engagement with the edge surface of the catch tension link and releases the lower horizontal pin from the tension link recess thereby releasing the upper moveable frame to be moved upward by the first coil spring and the second coil spring.

6. A mole trap comprising a base assembly including a first horizontal portion, a second horizontal portion that is parallel to and spaced from the first horizontal portion, a first transverse portion that is integral with the first horizontal portion and the second horizontal portion, a second transverse portion that is spaced from the first transverse portion and integral with the first horizontal portion and the second horizontal portion, a base aperture encircled by the first transverse portion, the first horizontal portion, the second transverse portion, and the second horizontal portion, and a third horizontal portion that is integral with the first transverse portion and the second transverse portion and parallel to the first horizontal portion and the second horizontal portion and bisects the base aperture;

a first vertical guide rod with a first guide rod lower end anchored to the base assembly near a third horizontal portion first end and at the first transverse portion, and a second vertical guide rod with a second guide rod lower end anchored to the base assembly near a third horizontal portion second end and at the second transverse portion;

an upper movable frame including a cross beam portion that is parallel to the third horizontal portion of the base assembly, a left side beam portion integral with a cross beam portion left end, a right side beam portion integral with a cross beam portion right end, a left vertical bore through the upper movable frame that telescopically receives a first vertical guide rod upper end, a right vertical bore through the upper movable frame that telescopically receives a second vertical guide rod upper end, a first vertical guide stop on the first vertical guide rod upper end, a second vertical guide stop on the second vertical guide rod upper end, and wherein the first vertical guide stop and the second vertical guide stop limit vertical movement of the upper movable frame away from the base assembly;

a first coil spring with a first spring upper arm and a first spring lower arm, a first spring upper arm free end slidably mounted on the first vertical guide rod, a first spring lower arm free end slidably mounted on the first vertical guide rod, a second coil spring with a second spring upper arm and a second spring lower arm, a second spring upper arm free end slidably mounted on the second vertical guide rod, a second spring lower arm free end slidably mounted on the second vertical guide rod, and wherein the first coil spring and the second coil spring bias the upper movable frame upward and away from the base assembly;

a first U-shaped rod with a first side portion, a second side portion and a lower transverse bar and wherein an upper end of the first side portion passes upward through a first vertical bore through the first transverse portion of the base assembly adjacent to the first horizontal portion, an upper end of the second side portion passes upward through a second vertical bore through the first transverse portion of the base assembly adjacent to the second horizontal portion, and wherein the upper end of the first side portion and the upper end of the second side portion are both clamped to the left side beam portion of the movable frame and move up and down with the movable frame;

a second U-shaped rod with a first side portion, a second side portion and a lower transverse bar and wherein an upper end of the first side portion passes upward through a first vertical bore through the second transverse portion of the base assembly adjacent to the first horizontal portion, and upper end of the second side portion passes upward through a second vertical bore through the second transverse portion of the base assembly adjacent to the second horizontal portion, and wherein the upper end of the first side portion and the upper end of the second side portion are both clamped to the right side beam portion of the movable frame and move up and down with the upper movable frame;

a lower horizontal pin fixed to the third horizontal portion, extending transversely toward the second horizontal portion of the base assembly, and wherein the lower horizontal pin is positioned an equal distance from the first vertical guide rod and the second vertical guide rod, an upper horizontal pin fixed to the cross beam of the upper movable frame and extending transversely in the direction of the second horizontal portion of the base assembly, a catch tension link pivotally attached to the upper horizontal pin and having an edge surface and a tension link recess in the edge surface and wherein the tension link recess receives the lower horizontal pin on the base assembly to hold the upper movable frame in a lowered position with the first coil spring and the second coil spring tensioned; and a bracket including a first flange, a second flange, bores through both flanges that receive the lower horizontal pin and pivotally attach the bracket to the lower horizontal pin and the base assembly, a tension link slot in the bracket, an upper release surface on the bracket, a lower release surface on the bracket, the upper release surface being movable into engagement with the edge surface of the catch tension member above the tension link recess in response to pivotal movement of the bracket about the lower horizontal pin in one direction, the lower release surface on the bracket being movable into engagement with the edge surface of the catch tension member below the tension link recess in response to pivotal movement of the bracket about the lower horizontal pin in another direction; and a bracket arm extending vertically downward from the bracket, and a mole sensor pivotally mounted on a bracket arm lower end for pivotal movement about a pivot shaft that is parallel to the lower horizontal pin.

7. A mole trap, as set forth in claim 6 wherein the first vertical guide rod, the second vertical guide rod and the bracket arm are in horizontal alignment with each other.

8. A mole trap, as set forth in claim 6, including a plurality of first side vertical spikes with first side spike upper ends secured to the first transverse portion of the base assembly, and a plurality of second side vertical spikes with second side spike upper ends secured to the second transverse portion of the base assembly.

9. A mole trap, as set forth in claim 6 wherein the lower horizontal pin is below the upper horizontal pin, in vertical alignment with the upper horizontal pin and parallel to the upper horizontal pin.

10. A mole trap, as set forth in claim 6, including a handle with a left vertical tube, a right vertical tube, a horizontal member connected to an upper end of the left vertical tube and to an upper end of the right vertical tube, a left vertical tube lower end connected to the upper movable frame, a right vertical tube lower end connected to the upper movable frame and wherein the first vertical guide rod extends into the left vertical tube and the second vertical guide rod extends into the right vertical tube.

11. A mole trap, as set forth in claim 6, wherein the first coil spring is pivotally attached to the first vertical guide rod and the second coil spring is pivotally attached to the second vertical guide.

* * * * *